(12) United States Patent
Wiegand et al.

(10) Patent No.: US 12,584,479 B2
(45) Date of Patent: ***Mar. 24, 2026

(54) VALVE COMPONENT

(71) Applicant: GD Energy Products, LLC, Tulsa, OK (US)

(72) Inventors: Troy Edward Wiegand, Fort Worth, TX (US); John Chase, Deer Park, TX (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,967

(22) Filed: Jan. 11, 2024

(65) Prior Publication Data

US 2024/0141887 A1 May 2, 2024

Related U.S. Application Data

(63) Continuation of application No. 17/897,429, filed on Aug. 29, 2022, now Pat. No. 11,913,447.

(51) Int. Cl.
F16K 15/02 (2006.01)
F04B 53/10 (2006.01)
(Continued)

(52) U.S. Cl.
CPC ........ F04B 53/1025 (2013.01); F04B 53/108 (2013.01); F04B 53/22 (2013.01);
(Continued)

(58) Field of Classification Search
CPC .... F04B 53/1025; F04B 53/108; F04B 53/22; F16K 15/021; F16K 15/026; F16K 15/036; F16K 1/36; Y10T 137/7939
See application file for complete search history.

(56) References Cited

U.S. PATENT DOCUMENTS 1,705,800 A   3/1929   Akeyson
1,716,896 A   6/1929   Miller
        (Continued)

FOREIGN PATENT DOCUMENTS

WO      2019169312 A1    9/2019

OTHER PUBLICATIONS

Notification of International Search Report and Written Opinion including International Search Report and Written Opinion for International Application No. PCT/US2025/034568 mailed Sep. 3, 2025, 16 pages.

*Primary Examiner* — Kelsey E Cary
(74) *Attorney, Agent, or Firm* — Edell, Shapiro & Finnan, LLC

(57) ABSTRACT

A valve component utilized in a fluid end assembly of a reciprocating pump may contain a multi-piece construction. The valve component may include a valve body portion, a leg assembly portion, a sealing element, and an insert at least partially captured between the valve body portion and the leg assembly portion. The insert may be constructed from a carbide or a ceramic material, and, when the valve component is fully assembled, may be compressed between the valve body portion and the leg assembly portion. The insert may at least partially form the strike surface of the valve component. The valve body portion and the leg assembly portion may both be constructed from a metallic material, and the valve body portion may define a sealing seat. The sealing element may be constructed from an elastomeric material that may be pre-formed and then compression molded onto the seat of the valve body.

17 Claims, 16 Drawing Sheets

(51) Int. Cl.
    *F04B 53/22*       (2006.01)
    *F16K 1/36*       (2006.01)
(52) U.S. Cl.
    CPC .............. *F16K 1/36* (2013.01); *F16K 15/021*
    (2013.01); *F16K 15/026* (2013.01); *Y10T*
                               *137/7939* (2015.04)

(56)               References Cited

U.S. PATENT DOCUMENTS

| | | | |
|---|---|---|---|
| 1,721,114 A | | 7/1929 | Earl |
| 1,725,297 A | | 8/1929 | Paterson |
| 2,018,288 A | | 10/1935 | Steirly |
| 2,107,200 A | | 2/1938 | Kennon |
| 2,260,381 A | | 10/1941 | Kennon |
| 2,745,631 A | | 5/1956 | Shellman |
| 2,792,016 A | | 5/1957 | Shellman |
| 2,898,082 A | | 8/1959 | Von Almen |
| 2,903,235 A | * | 9/1959 | Rodgers .............. F04B 53/1087 |
| | | | 251/332 |
| 3,057,372 A | | 10/1962 | Sutton |
| 3,070,120 A | | 12/1962 | Wendt |
| 3,324,880 A | | 6/1967 | Roberts |
| 3,483,885 A | | 12/1969 | Leathers |
| 4,076,212 A | | 2/1978 | Leman |
| 4,487,222 A | | 12/1984 | Crawford |
| 4,545,404 A | | 10/1985 | Redwine |
| 4,687,421 A | | 8/1987 | Cameron |
| 4,768,933 A | | 9/1988 | Stachowiak |
| 4,860,995 A | | 8/1989 | Rogers |
| 4,951,707 A | | 8/1990 | Johnson |
| 5,052,435 A | | 10/1991 | Crudup |
| 5,062,450 A | | 11/1991 | Bailey |
| 5,082,020 A | | 1/1992 | Bailey |
| 5,088,521 A | | 2/1992 | Johnson |
| 5,193,577 A | | 3/1993 | de Koning |
| 5,275,204 A | | 1/1994 | Rogers |
| 6,808,157 B1 | | 10/2004 | Mudge |
| 6,955,181 B1 | | 10/2005 | Blume |
| 7,159,731 B2 | | 1/2007 | Kai |
| 7,591,450 B1 | | 9/2009 | Blume |
| 7,641,175 B1 | | 1/2010 | Blume |
| 8,074,679 B2 | | 12/2011 | Jensen |
| 8,784,081 B1 | | 7/2014 | Blume |
| 8,998,593 B2 | | 4/2015 | Vicars |
| 9,435,454 B2 | | 9/2016 | Blume |
| 9,470,226 B2 | | 10/2016 | Johnson |
| 9,500,195 B2 | | 11/2016 | Blume |
| 9,927,036 B2 | | 3/2018 | Dille |
| 10,240,597 B2 | | 3/2019 | Bayyouk |
| 10,288,178 B2 | | 5/2019 | Nowell et al. |
| 10,400,764 B2 | | 9/2019 | Wagner |
| 10,591,070 B2 | | 3/2020 | Nowell et al. |
| 10,648,490 B2 | | 5/2020 | Nowell et al. |
| 10,670,013 B2 | | 6/2020 | Nowell et al. |
| 10,711,778 B2 | | 7/2020 | Buckley |
| 10,760,568 B2 | | 9/2020 | Johnson |
| 10,774,828 B1 | | 9/2020 | Smith |
| 10,808,851 B1 | | 10/2020 | Surjaatmadja et al. |
| 10,895,325 B2 | | 1/2021 | Nowell et al. |
| 10,907,738 B2 | | 2/2021 | Nowell et al. |
| 10,941,765 B2 | | 3/2021 | Nowell et al. |
| 10,941,866 B2 | | 3/2021 | Nowell et al. |
| 10,962,001 B2 | | 3/2021 | Nowell et al. |
| D920,476 S | | 5/2021 | Grassl |
| 11,041,570 B1 | | 6/2021 | Buckley et al. |
| 11,078,903 B2 | | 8/2021 | Nowell et al. |
| 11,085,544 B2 | | 8/2021 | Yeung |
| 11,143,315 B2 | | 10/2021 | Nowell et al. |
| 11,225,861 B1 | | 1/2022 | Dille |
| 11,280,332 B2 | | 3/2022 | Zitting |
| 11,280,411 B1 | | 3/2022 | Johnson |
| 11,353,117 B1 | | 6/2022 | Smith |
| 11,359,739 B2 | | 6/2022 | Dyer |
| 11,384,756 B1 | | 7/2022 | Smith |
| 11,391,374 B1 | | 7/2022 | Ellisor |
| 11,421,679 B1 | | 8/2022 | Mullins |
| 11,421,680 B1 | | 8/2022 | Smith |
| 11,434,900 B1 | | 9/2022 | Alex |
| 11,441,683 B2 | | 9/2022 | Mullins |
| 11,454,321 B2 | | 9/2022 | Mullins |
| 11,761,441 B1 | | 9/2023 | Alex |
| 11,920,684 B1 | | 3/2024 | Xu et al. |
| 2006/0202150 A1 | | 9/2006 | Johnson |
| 2007/0295411 A1 | | 12/2007 | Schwegman |
| 2008/0279706 A1 | | 11/2008 | Gambier |
| 2013/0020521 A1 | | 1/2013 | Byrne |
| 2013/0202457 A1 | | 8/2013 | Bayyouk |
| 2014/0260954 A1 | | 9/2014 | Young |
| 2014/0264133 A1 | | 9/2014 | Johnson |
| 2015/0144826 A1 | | 5/2015 | Bayyouk |
| 2015/0260177 A1 | | 9/2015 | Deel |
| 2016/0215588 A1 | | 7/2016 | Belshan |
| 2016/0312903 A1 | | 10/2016 | Dille |
| 2017/0002947 A1 | | 1/2017 | Bayyouk |
| 2017/0037847 A1 | | 2/2017 | Johnson |
| 2017/0089470 A1 | | 3/2017 | Filipow |
| 2017/0298932 A1 | | 10/2017 | Wagner |
| 2017/0342976 A1 | | 11/2017 | Nagaraja |
| 2017/0356440 A1 | | 12/2017 | Johnson |
| 2018/0266573 A1 | | 9/2018 | Nowell et al. |
| 2018/0298893 A1 | | 10/2018 | Buckley |
| 2019/0011051 A1 | | 1/2019 | Yeung |
| 2019/0040966 A1 | | 2/2019 | Myers |
| 2019/0101109 A1 | | 4/2019 | Cortes |
| 2019/0120389 A1 | | 4/2019 | Nowell et al. |
| 2019/0178243 A1 | | 6/2019 | Nowell et al. |
| 2019/0226589 A1 | | 7/2019 | Nowell et al. |
| 2019/0316685 A1 | | 10/2019 | Wang |
| 2019/0360483 A1 | | 11/2019 | Nowell et al. |
| 2019/0368616 A1 | | 12/2019 | Hagen |
| 2019/0368619 A1 | | 12/2019 | Barnett et al. |
| 2020/0072369 A1 | | 3/2020 | Singley |
| 2020/0232450 A9 | | 7/2020 | Nowell et al. |
| 2020/0240407 A1 | | 7/2020 | Naedler |
| 2020/0284253 A1 | | 9/2020 | Foster et al. |
| 2020/0332792 A1 | | 10/2020 | Buckley |
| 2020/0400140 A1 | | 12/2020 | Bayyouk |
| 2021/0017982 A1 | | 1/2021 | Bayyouk |
| 2021/0048020 A1 | | 2/2021 | Johnson |
| 2021/0095650 A1 | | 4/2021 | Nowell et al. |
| 2021/0102630 A1 | | 4/2021 | Nowell et al. |
| 2021/0108734 A1 | | 4/2021 | Nowell et al. |
| 2021/0190067 A1 | | 6/2021 | Nowell et al. |
| 2021/0190223 A1 | | 6/2021 | Bayyouk et al. |
| 2021/0215154 A1 | | 7/2021 | Nowell et al. |
| 2021/0341079 A1 | | 11/2021 | Thomas |
| 2021/0348690 A1 | | 11/2021 | Nowell et al. |
| 2021/0404561 A1 | | 12/2021 | Nowell et al. |
| 2022/0065353 A1 | | 3/2022 | Johnson |

* cited by examiner

VALVE COMPONENT

CROSS REFERENCE TO RELATED APPLICATIONS

This application is a continuation of U.S. nonprovisional application Ser. No. 17/897,429, filed on Aug. 29, 2022, and entitled "Valve Component," the disclosure of which is incorporated herein by reference in entirety.

FIELD OF THE INVENTION

The present invention relates to the field of high pressure reciprocating pumps and, in particular, to the seals utilized in the fluid ends of high pressure reciprocating pumps.

BACKGROUND OF THE INVENTION

High pressure reciprocating pumps are often used to deliver high pressure fluids during earth drilling operations. One or more sealing arrangements are typically provided in the fluid end to seal conduits formed in the fluid end and prevent, or at least discourage, leakage. More specifically, the fluid end may define an internal chamber and one or more conduits may define pathways between the internal chamber and one or more external surfaces of the fluid end. At least some segments of these conduits may be sealed with a sealing assembly (e.g., a cover, plug, and/or sleeve) that includes or defines one or more seals. Additionally, or alternatively, some of the segments may include valves or valve components that include or define one or more seals. These seals may prevent, or at least discourage, leakage through the conduits.

The high pressures experienced by these reciprocating pumps result in component failures that are not typically seen or experienced with pumps that operate at lower pressures. Typical failures may include erosion or wearing of the valve strike surface/sealing face. This may be accelerated due to the forces exerted by and onto the valve strike surface when compressed against a corresponding valve seat. The higher the pressures experienced by the reciprocating pumps, the faster the valves are eroded. When the valve strike face fails, leakages occur around the valve, which ultimately reduces the maximum pressure and flow capabilities of the pump.

SUMMARY

The present application relates to techniques for sealing a segment of a fluid end of a high pressure reciprocating pump. The techniques may be embodied as a valve component and/or a sealing assembly that is provided independent of any other elements or that is incorporated in a fluid end as part of a kit, as part of a fluid end, and/or as part of a reciprocating pump.

In one embodiment, a valve for a reciprocating pump may include a valve body, a leg assembly, and an insert. The valve body may have a first side and an opposite second side. The leg assembly may also have a first side and an opposite second side. The first side of the leg assembly may be removably coupled to the second side of the valve body such that the first side of the leg assembly is disposed adjacent to the second side of the valve body. The insert may be at least partially captured between the second side of the valve body and the leg assembly when the leg assembly is coupled to the valve body.

In some instances, the insert may be annular with a central opening. The insert may further include a first side and an opposite second side. The second side of the insert may be angled with respect to the first side of the insert, and the second side of the insert may form at least a portion of a strike surface of the valve. In some further instances, the insert may further include an annular channel disposed around an interior surface of the central opening.

In accordance with some instances, the leg assembly may further include a sidewall spanning between the first side and the second side, and a flange extending radially from the sidewall. When the leg assembly is coupled to the valve body, the flange may be disposed in the annular channel of the insert.

In some even further instances, the second side of the valve body may include a central aperture equipped with a first set of threads. In addition, the leg assembly may further include an extension member that extends from the first side of the leg assembly. The extension member may be equipped with a second set of threads that are configured to engage with the first set of threads. The extension member may be configured to be screwed into the central aperture of the valve body to removably couple the leg assembly to the valve body.

In some additional instances, the insert may be constructed from a carbide material. In other instances, the insert may be constructed from a ceramic material.

In another embodiment, a valve for a reciprocating pump may include a valve body, a leg assembly, and an insert. The leg assembly may be removably coupled to the valve body. In addition, the leg assembly may have a base portion and a set of legs extending from the base portion. The insert may be at least partially disposed between the valve body and the base portion of the leg assembly such that the insert is in abutment with both the valve body and the base portion of the leg assembly.

In some instances, the insert may be annular with a central opening. The insert may further include an annular channel disposed around an interior surface of the central opening. In some further instances, the base portion of the leg assembly may be cylindrical and may include a first side, a second side opposite the first side, a sidewall spanning between the first side and the second side, and a flange extending radially from the sidewall proximate to the second side. When the leg assembly is coupled to the valve body, the flange may be disposed in the annular channel of the insert to retain the insert in abutment with both the valve body and the base portion of the leg assembly.

Still further, in some instances, the insert may include a first side and a second side opposite the first side. The second side may be angled with respect to the first side. In addition, the second side may form at least a portion of a strike surface of the valve.

In yet another embodiment, a valve for a reciprocating pump may include a valve body, an insert, and a leg assembly. The insert may be disposed against the valve body. In addition, the leg assembly may be removably coupled to valve body. The leg assembly may include a base portion and a set of legs extending from the base portion. When the leg assembly is removably coupled to the valve body, the base portion may be configured to compress at least a portion of the insert against the valve body.

In some instances, the insert may be annular with a central opening. The insert may further include an annular channel disposed around an interior surface of the central opening. In some further instances, the base portion of the leg assembly may be cylindrical and may include a first side, a second side opposite the first side, a sidewall spanning between the first side and the second side, and a flange extending radially from the sidewall proximate to the second side. When the leg assembly is coupled to the valve body, the flange may be disposed in the annular channel of the insert.

Still further, in some instances, the insert may include a first side and a second side opposite the first side. The second side may be angled with respect to the first side. In addition, the second side may form at least a portion of a strike surface of the valve.

BRIEF DESCRIPTION OF THE DRAWINGS

The apparatuses, systems, devices, modules, valve components, valve seats, seals, and/or sealing elements presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts throughout the different views.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Also, the terms "comprising," "including," "having," and the like, as used with respect to embodiments of the present disclosure, are synonymous.

Figure 1A:
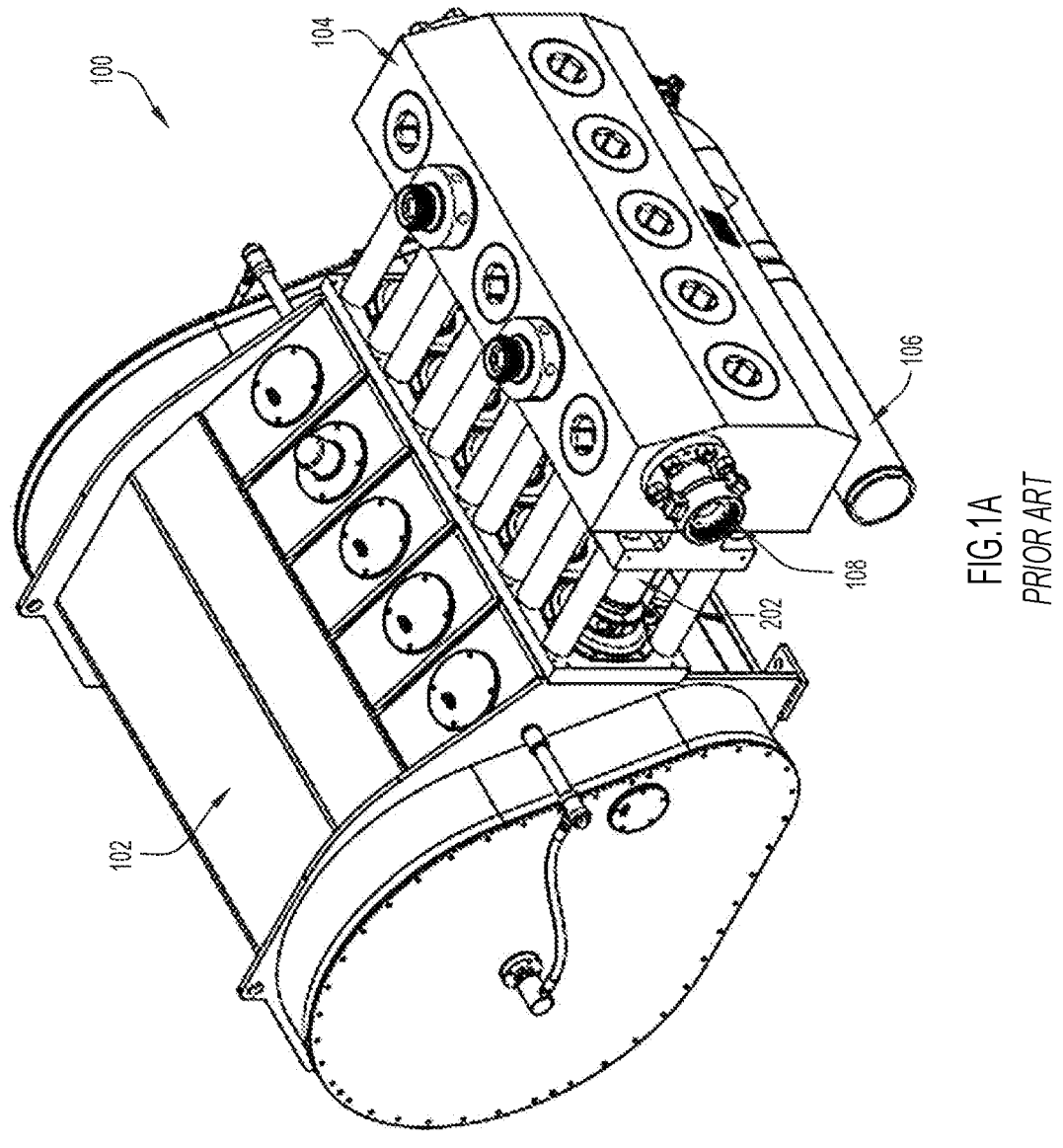
FIG. 1A is a perspective view of a prior art reciprocating pump including a fluid end.

Referring to FIG. 1A, depicted is a prior art reciprocating pump 100. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations.

Often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, especially typical "wear" components, and extend the time between maintenance operations (i.e., between downtime) are highly desirable.

Figure 1B:
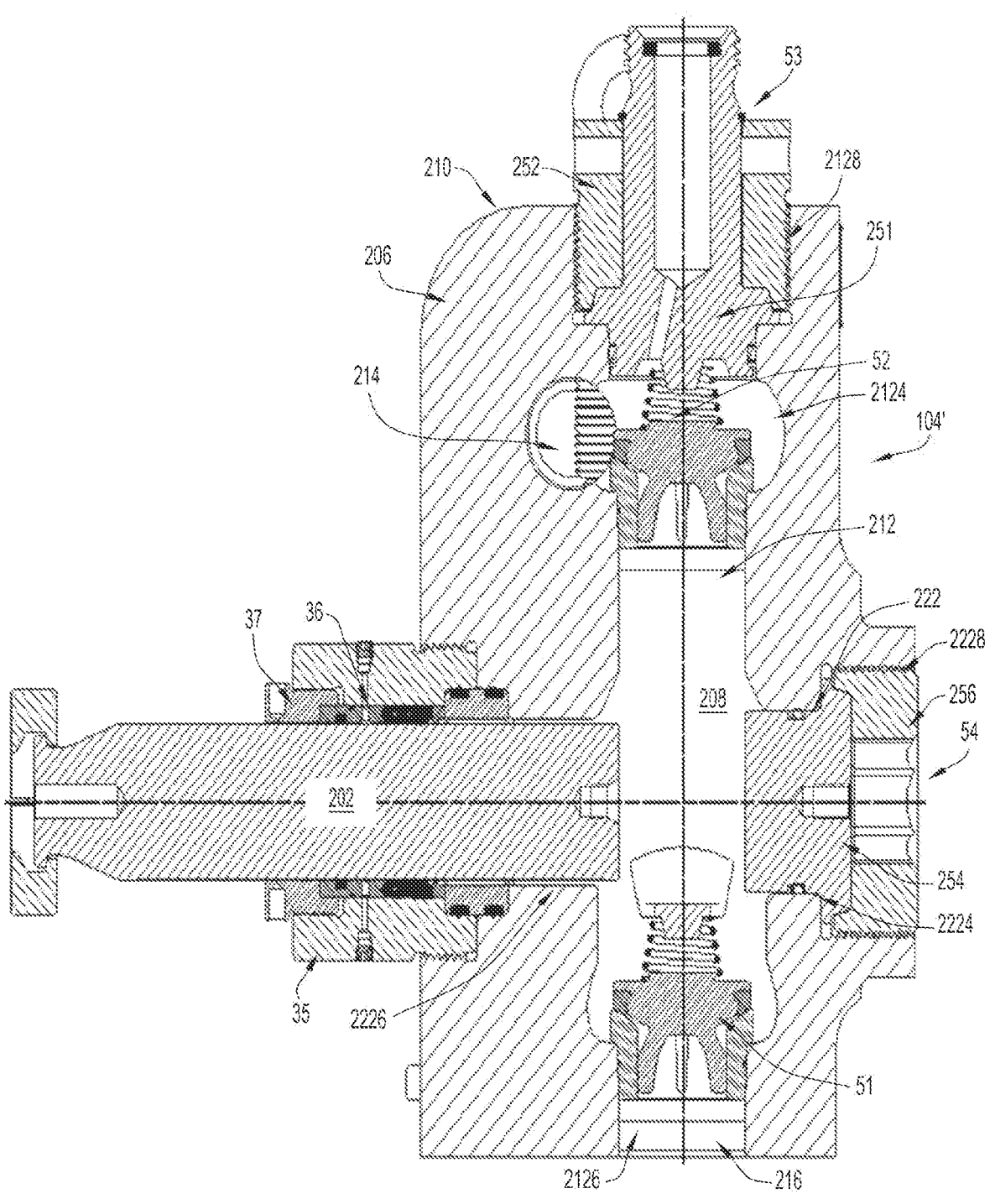
FIG. 1B is a cross sectional view of another prior art fluid end.

Still referring to FIG. 1A, but now in combination with FIG. 1B, in various embodiments, the fluid end 104 may be shaped differently and/or have different features, but may still generally perform the same functions, define similar structures, and house similar components. To illustrate potential shape variations, FIG. 1B shows a side, sectional view of a fluid end 104' with different internal and external shaping as compared to fluid end 104. However, since fluid end 104 and fluid end 104' have many operational similarities, FIGS. 1A and 1B are labeled with the same reference numerals and are both described with respect to these common reference labels.

The sectional view of FIG. 1B is taken along a central or plunger axis of one of the plungers 202 included in a reciprocating pump 100. Thus, although FIG. 1B depicts a single pumping chamber 208, it should be understood that a fluid end 104 can include multiple pumping chambers 208 arranged side-by-side. In fact, in at least some embodiments (e.g., the embodiment of FIG. 1A), a casing 206 of the fluid end 104 forms a plurality of pumping chambers 208 and each chamber 208 includes a plunger 202 that reciprocates within the casing 206. However, side-by-side pumping chambers 208 need not be defined by a single casing 206. For example, in some embodiments, the fluid end 104 may be modular and different casing segments may house one or more pumping chambers 208. In any case, the one or more pumping chambers 208 are arranged side-by-side so that corresponding conduits are positioned adjacent each other and generate substantially parallel pumping action. Specifically, with each stroke of the plunger 202, low pressure fluid is drawn into the pumping chamber 208 and high pressure fluid is discharged. But, often, the fluid within the pumping chamber 208 contains abrasive material (i.e., "debris") that can damage seals formed in the reciprocating pump 100.

As can be seen in FIG. 1B, the pumping paths and pumping chamber 208 of the fluid end 104 are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, conduit 212 intersects conduit 222 to at least partially (and collectively) define the pumping chamber 208. In the prior art fluid end 104 and prior art fluid end 104', conduits 212 and 222 are substantially cylindrical, but the diameters of conduit 212 and conduit 222 may vary throughout the casing 206 so that conduits 212 and 222 can receive various structures, such as sealing assemblies or components thereof.

Regardless of the diameters of conduit 212 and conduit 222, each conduit may include two segments, each of which extend from the pumping chamber 208 to the external surface 210 of the casing 206. Specifically, conduit 212 includes a first segment 2124 and a second segment 2126 that opposes the first segment 2124. Likewise, conduit 222 includes a third segment 2224 and a fourth segment 2226 that opposes the third segment 2224. In the depicted embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

In the depicted embodiment, conduit 212 defines a fluid path through the fluid end 104. Segment 2126 is an intake segment that connects the pumping chamber to a piping system 106 delivering fluid to the fluid end 104. Meanwhile, segment 2124 is an outlet or discharge segment that allows compressed fluid to exit the fluid end 104. Thus, in operation, segments 2126 and 2124 may include valve components 51 and 52, respectively, (e.g., one-way valves) that allow segments 2126 and 2124 to selectively open. Typically, valve components 51 in the inlet segment 2126 may be secured therein by a piping system 106 (as illustrated in FIG. 1A). Meanwhile valve components 52 in outlet segment 2124 may be secured therein by a closure assembly 53 that, in the prior art example depicted in FIG. 1B, includes a closure element 251 (also referred to as a discharge plug) that is secured in the segment 2124 by a retaining assembly 252. Specifically, the prior art retaining assembly 252 is coupled to segment 2124 via threads 2128 defined by an interior wall of segment 2124.

On the other hand, segment 2226 defines, at least in part, a cylinder for plunger 202, and/or connects the casing 206 to a cylinder for plunger 202. For example, in the depicted embodiment, a casing segment 35 is secured to segment 2226 and houses a packing assembly 36 configured to seal against a plunger 202 disposed interiorly of the packing assembly 36. In any case, reciprocation of a plunger 202 in or adjacent to segment 2226, which may be referred to as a reciprocation segment, draws fluid into the pumping chamber 208 via inlet segment 2126 and pumps the fluid out of the pumping chamber 208 via outlet segment 2124. Notably, in the depicted prior art arrangement, the packing assembly 36 is retained within casing segment 35 with a retaining element 37 that is threadably coupled to casing segment 35.

Segment 2224 is an access segment that can be opened to access to parts disposed within casing 206 and/or surfaces defined within casing 206. During operation, access segment 2224 may be closed by a closure assembly 54 that, in the prior art example depicted in FIG. 1B, includes a closure element 254 (also referred to as a suction plug) that is secured in the segment 2224 by a retaining assembly 256. Notably, the prior art retaining assembly 256 is coupled to segment 2224 via threads 2228 defined by an interior wall of segment 2224. However, in some embodiments, conduit 222 need not include segment 2224 and conduit 222 may be formed from a single segment (segment 2226) that extends from the pumping chamber 208 to the external surface 210 of casing 206.

Overall, in operation, fluid may enter fluid end 104 (or fluid end 104') via multiple openings, as represented by opening 216 in FIG. 1B, and exit fluid end 104 (or fluid end 104') via multiple openings, as represented by opening 214 in FIG. 1B. In at least some embodiments, fluid enters openings 216 via pipes of piping system 106, flows through pumping chamber 208 (due to reciprocation of a plunger 202), and then flows through openings 214 into a channel 108. However, piping system 106 and channel 108 are merely example conduits and, in various embodiments, fluid end 104 may receive and discharge fluid via any number of pipes and/or conduits, along pathways of any desirable size or shape.

Also, during operation of pump 100, the first segment 2124 (of conduit 212), the third segment 2224 (of conduit 222), and the fourth segment 2226 (of conduit 222) may each be "closed" segments. By comparison, the second segment 2126 (of conduit 212) may be an "open" segment that allows fluid to flow from the external surface 210 to the pumping chamber 208. That is, for the purposes of this application, a "closed" segment may prevent, or at least substantially prevent, direct fluid flow between the pumping chamber 208 and the external surface 210 of the casing 206 while an "open" segment may allow fluid flow between the pumping chamber 208 and the external surface 210. To be clear, "direct fluid flow" requires flow along only the segment so that, for example, fluid flowing from pumping chamber 208 to the external surface 210 along segment 2124 and channel 108 does not flow directly to the external surface 210 via segment 2124.

Figure 2:
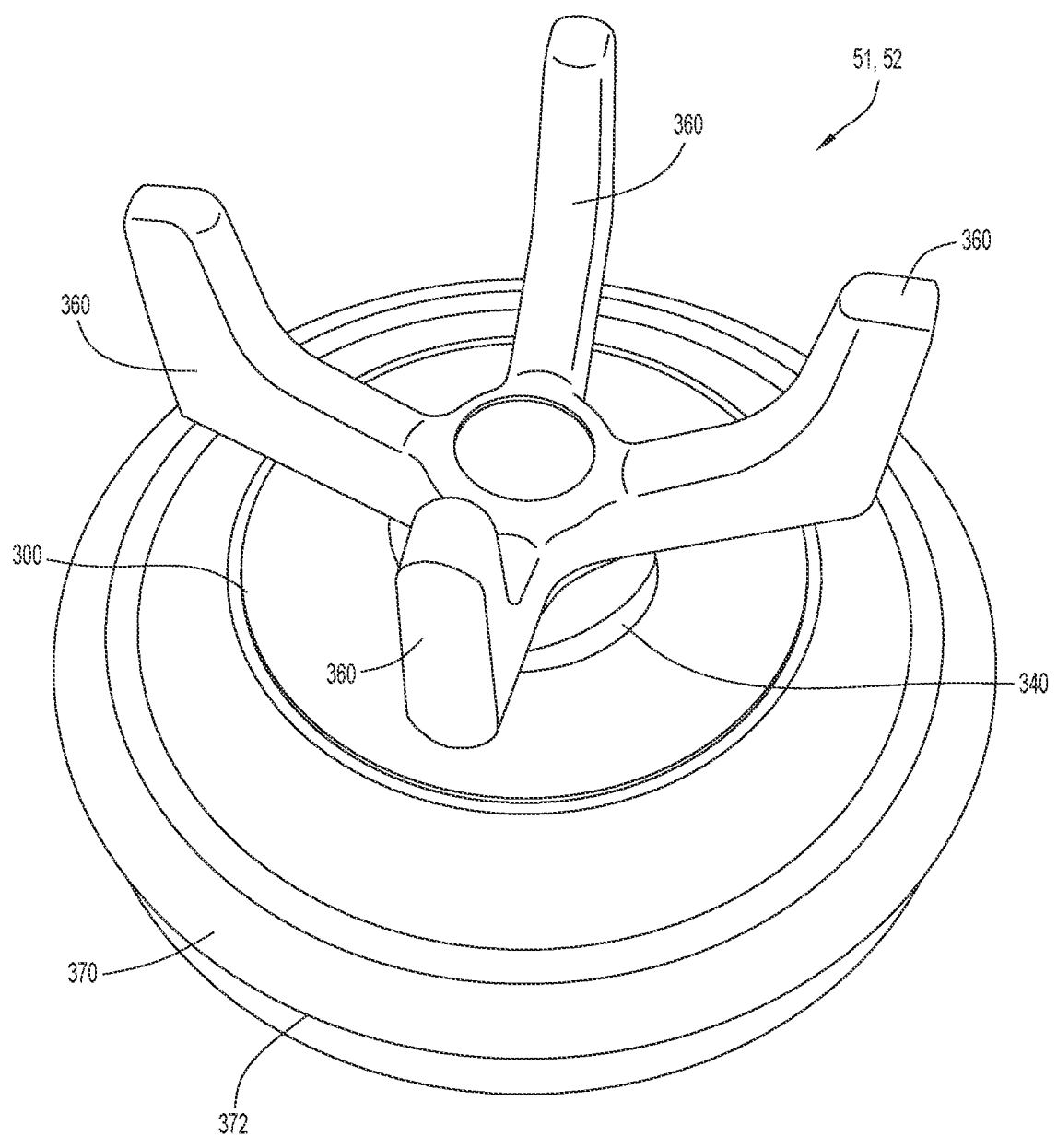
FIG. 2 illustrates a perspective view of a prior art valve component that may be utilized in the fluid ends illustrated in FIGS. 1A and 1B.

Turning to FIG. 2, illustrated is a perspective views of the valve components 51, 52 depicted in FIG. 1B. The valve components 51, 52 may include a valve body 300, a leg assembly 340, and a sealing element or seal 370. The valve body 300 and the leg assembly 340 may be constructed from a metal, a metal alloy, or other similar material. The seal 370 may be a homogeneous elastomeric sealing element constructed from a material suitable for forming a seal, such as, but not limited to rubbers, thermoplastic materials (e.g., thermoplastic polyurethane (TPU), etc.), etc.

Figure 3:
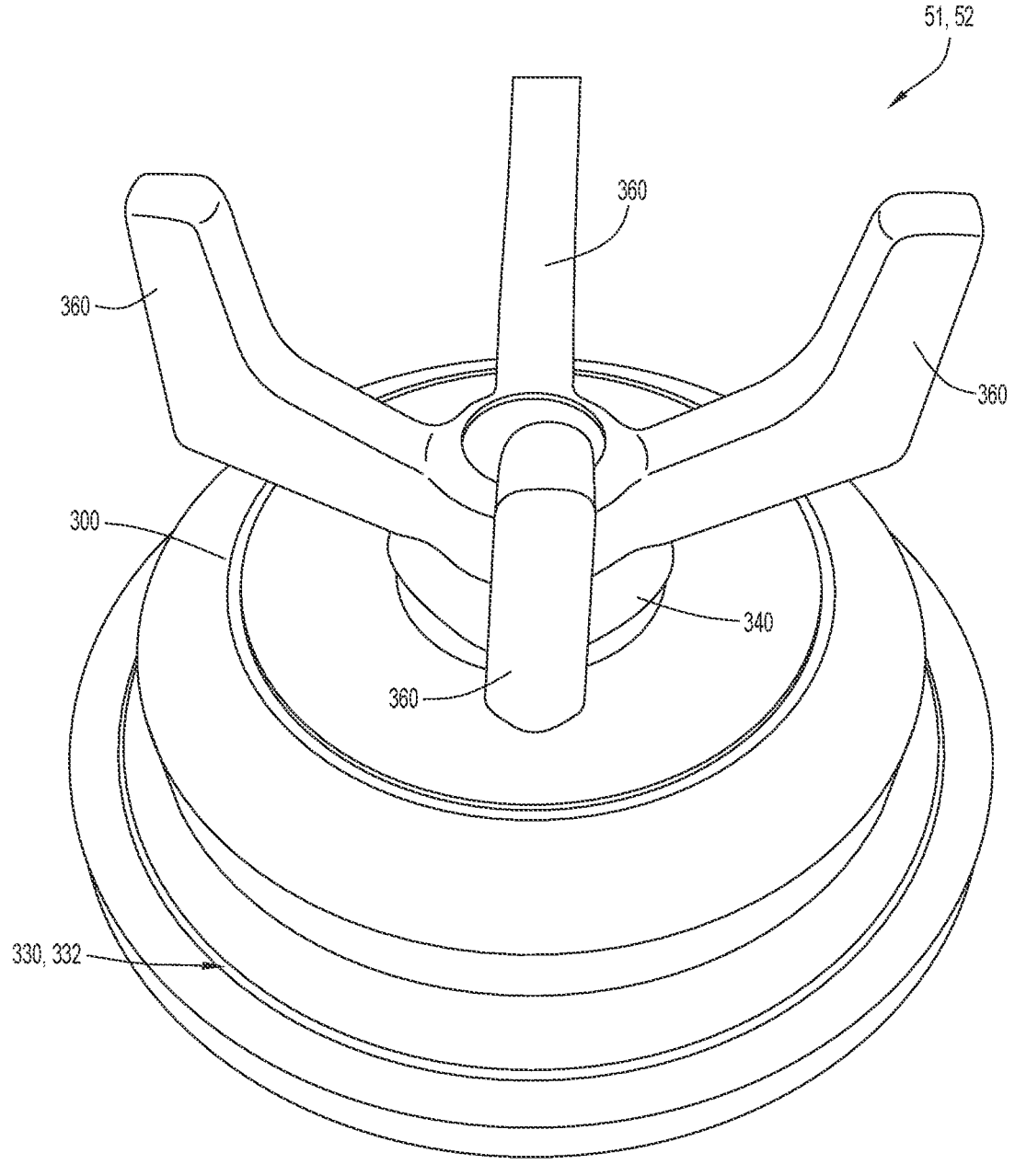
FIG. 3 illustrates a perspective view of the prior art valve component illustrated in FIG. 2, the valve component being shown without a seal or sealing element.
Figure 4:
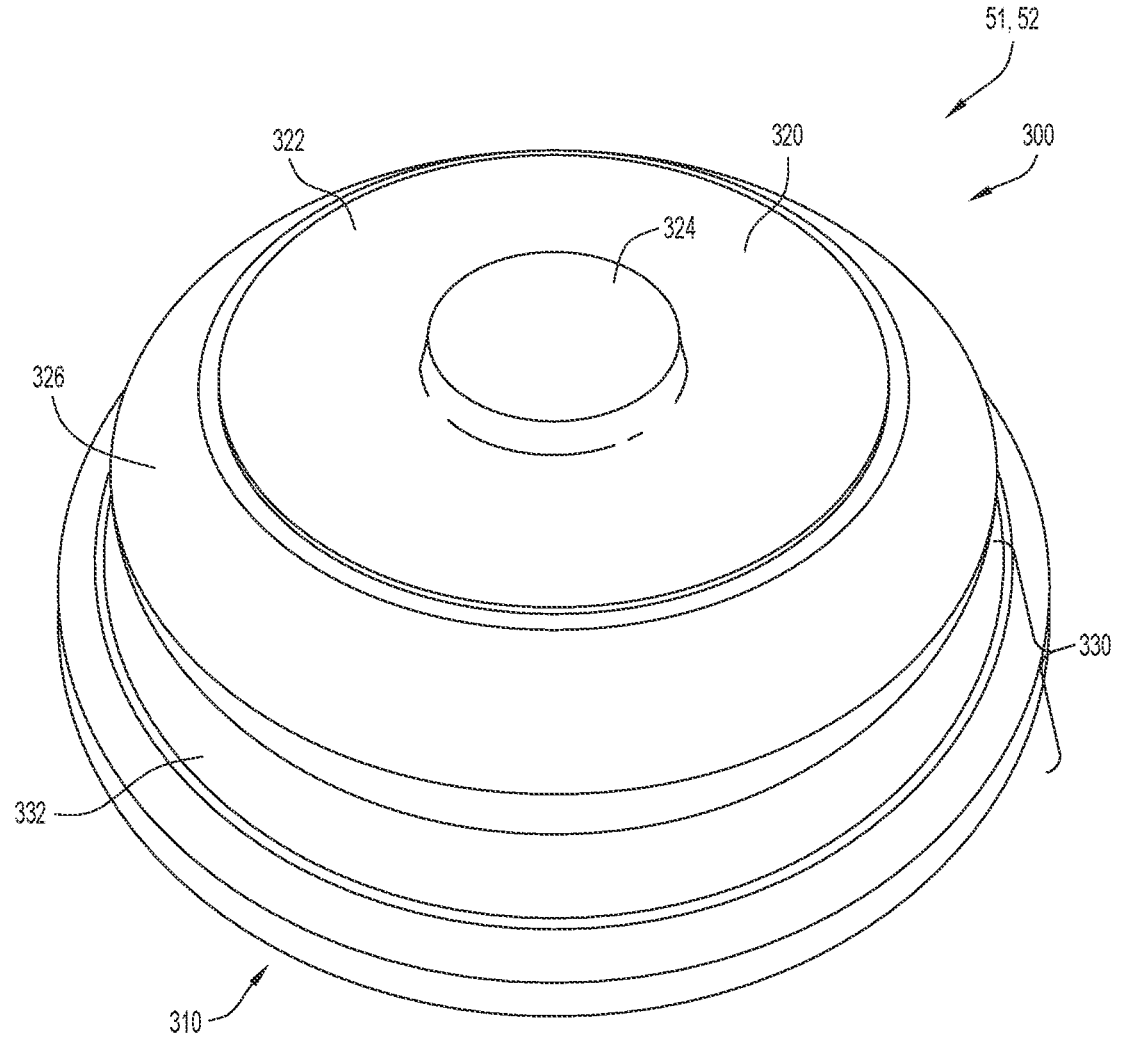
FIG. 4 illustrates an isolated perspective view of the valve body of the prior art valve component illustrated in FIG. 2.
Figure 6:
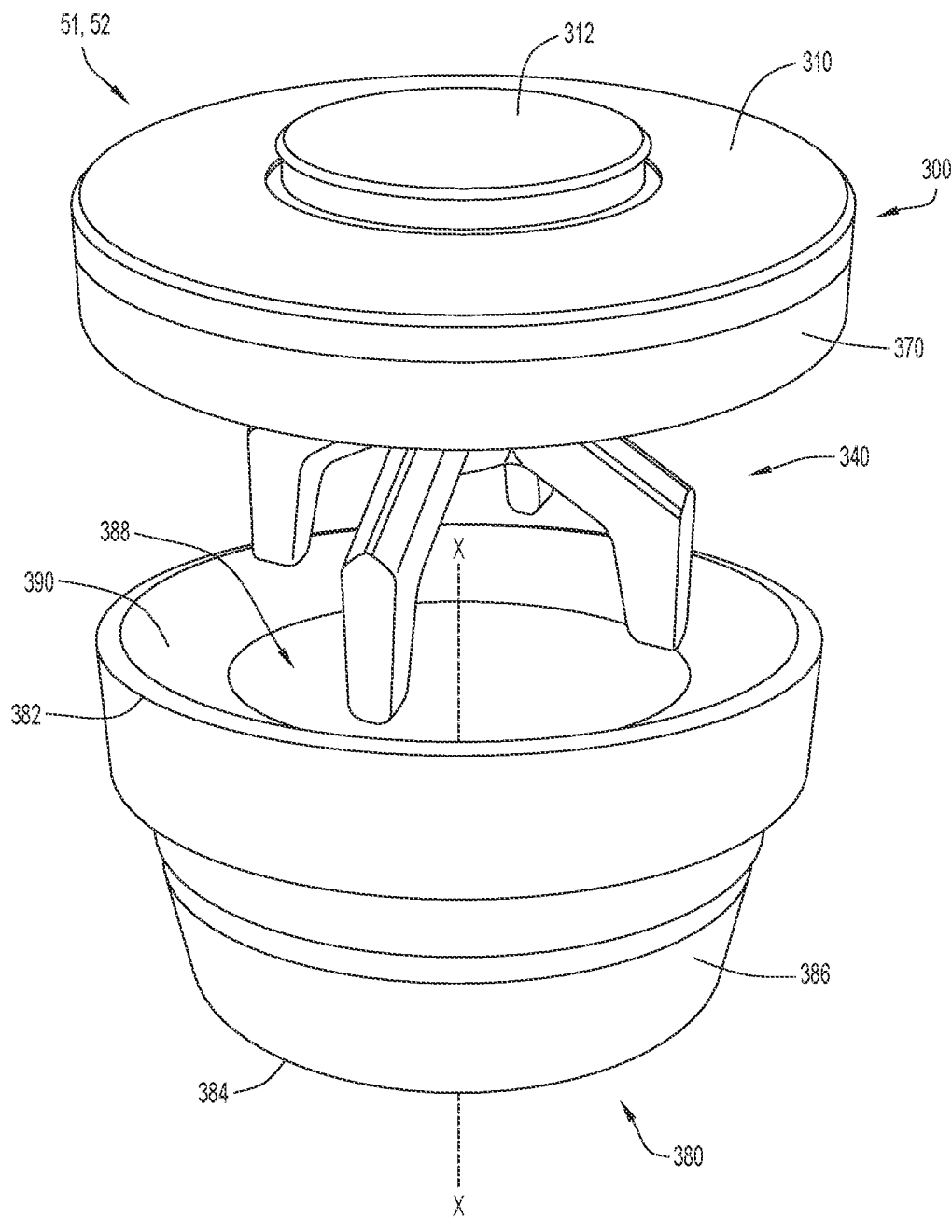
FIG. 6 illustrates a perspective view of the prior art valve component illustrated in FIG. 2 being inserted into a corresponding prior art valve seat to form a sealing arrangement.

As best illustrated in FIGS. 2, 3, and 4, the valve body 300 may have a substantially circular cross section and may include a first side 310 and an opposite second side 320. The first side 310 (as best illustrated in FIG. 6), may be substantially planar with a central cylindrical protrusion 312. The second side 320 of the valve body 300 may include a central portion 322 and a sealing portion 330. The central portion 322 may be substantially planar and may be oriented parallel to the first side 310. As best illustrated in FIG. 4, an attachment protrusion 324 may be centrally disposed on the central portion 322 and extend therefrom. A strike surface 326 that is angled with respect to the surface of the central portion 322 of the second side 320, and with respect to the first side 310, is disposed around the perimeter of the central portion 322. As further illustrated in FIGS. 3 and 4, the second side 320 of the valve body 300 may be smaller in diameter than the first side 310. FIGS. 3 and 4 further depict a sealing portion 330 between the strike surface 326 and the first side 310. The sealing portion 330 may define a seal seat 332 disposed between the end of the strike surface 326 and the first side 310 (i.e., and, ultimately, between the first side 310 and the second side 320). As best illustrated in FIG. 2, the seal seat 332 of the sealing portion 330 may be configured to receive the sealing element or seal 370.

Figure 5:
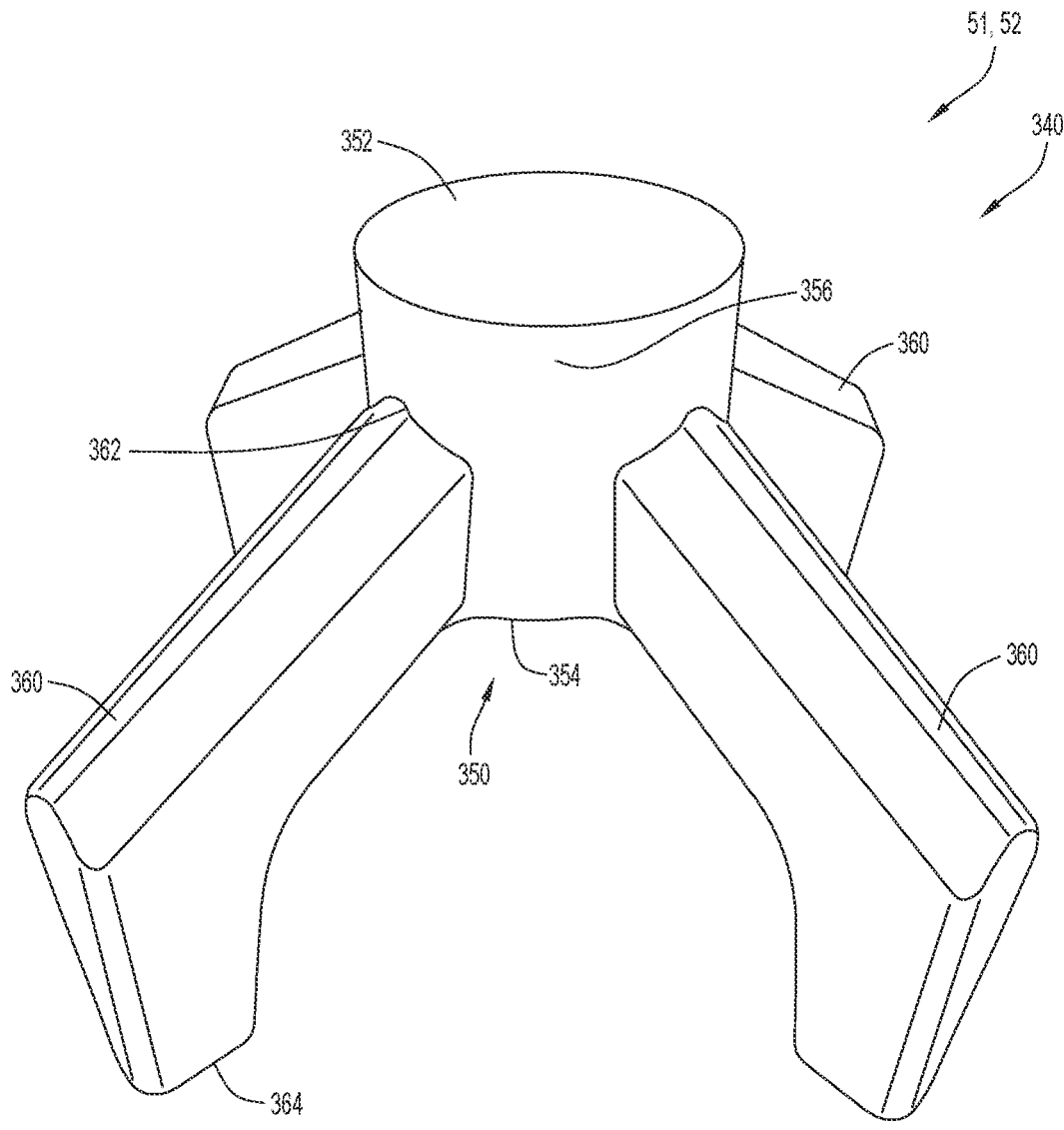
FIG. 5 illustrates an isolated perspective view of the leg assembly of the prior art valve component illustrated in FIG. 2.

Turning to FIG. 5, and with continued reference to FIGS. 2 and 3, the leg assembly 340 of the valve component 51, 52 may include a main body or base portion 350 and a set of legs 360. The main body 350 may also be substantially or generally cylindrical, having a first end 352, an opposite second end 354, and a sidewall 356 spanning between the first and second ends 352, 354. The set of legs 360 may be in the form of extension members that are generally L-shaped. Each leg 360 may have a first end 362 coupled to the main body 350 of the leg assembly 340 and an opposite second end 364. As best illustrated in FIG. 5, the first end 362 of each of the legs 360 may be coupled to the sidewall 356 of the main body 350 proximate to the second end 354 of the main body 350. The legs 360 may extend outwardly from the sidewall 356 of the main body 350 and beyond the second end 354 of the main body 350. As further illustrated, the legs 360 may be equally spaced from one another around the main body 350.

In the illustrated embodiment, the leg assembly 340 may be coupled to the valve body 300. More specifically, the first end 352 of the main body 350 of the leg assembly 340 may be coupled, via friction stir welding, to the attachment protrusion 324 of the valve body 300. However, in some other embodiments, the leg assembly 340 may be formed uniformly with the valve body 300. As further described below, the legs 360 of the leg assembly 340 may be configured to extend into a central opening or conduit 388 of a valve seat 380 (see FIG. 6) to guide the valve component 51,52 into a sealing position with the valve seat 380.

With continued reference to FIG. 2, and as previously explained, the seal 370 may be coupled to the valve body 300 at the sealing portion 330, and may be a homogeneous elastomeric sealing element. The seal 370 may include a sealing surface 372 and an opposite attachment surface (not shown). The attachment surface may be coupled to the sealing portion 330 of the valve body 300 in a manner where the seal 370 may be molded onto, adhered to, or bonded to the sealing portion 330 of the valve body 300. When coupled to the valve body 300, the sealing surface 372 may serve as an extension of the strike surface 326 of the valve body 300. In other words, the seal 370 may, in conjunction with the strike surface 326 of the valve body 300, form a sealing surface of the valve component 51, 52.

Turning to FIG. 6, illustrated is a perspective view of the prior art valve component 51, 52 being inserted into a prior art valve seat 380, which may be representative of that depicted within the chamber 208 of the casing 206 in FIG. 1B. The valve seat 380, as illustrated, may be substantially cylindrical with a first end 382, an opposite second end 384, and an outer surface 386 spanning between the first end 382 and the second end 384. The valve seat 380 may further include a central conduit 388 extending through the valve seat 380 from the first end 382 to the second end 384. The first end 382 of the valve seat 380 may further include a corresponding sealing surface or strike surface 390 that extends into the conduit 388, and is oriented at an angle with respect to a central axis of the conduit 388 such that the sealing surface 390 converges into the conduit toward the central axis X. In other words, items, components, structures, fluids, etc. that contact the sealing surface 390 may be funneled into the conduit 388.

As best illustrated in FIG. 6, as the valve component 51, 52 is moved toward the sealing surface 390 of the valve seat 380, outer surfaces of the legs 360 of the valve component 51, 52 may contact the inner surface of the conduit 388 of the valve seat 380 to position the valve component 51, 52 with respect to the valve seat 380. Consequently, the sealing surface 372 of the seal 370 and the strike surface 326 of the valve body 300 are properly aligned with the corresponding sealing surface 390 of the valve seat 380. If the valve component 51, 52 is misaligned with the valve seat 380, the legs 360 of the valve component 51, 52 may contact the sealing surface 390, which then guides the legs 360 into the conduit 388 (and aligns the valve component 51, 52 with the valve seat 380) as the valve component 51, 52 is translated toward the valve seat 380. When the legs 360 of the valve component 51, 52 are fully inserted into the conduit 388, the sealing surface 372 of the seal 370 and the strike surface 326 of the valve body 300 contact, and are in abutment with, the corresponding sealing surface 390 of the valve seat 380.

As the valve component 51, 52 is repeatedly translated away from and toward the corresponding sealing surface 390 of the valve seat 380 during operation of the pump 100, the strike surface 326 of the valve body 300 may become worn. This may be due, at least in part, to the high pressures exerted on the valve component 51, 52, particles in the operating fluid passing through the conduit 388 and over the strike surface 326, and the repeated impact of the strike surface 326 on the sealing surface 390 of the valve seat 380. Once the strike surface 326 of the valve body 300 wears to a certain degree, the valve component 51, 52 no longer functions properly (i.e., does not properly seal against the valve seat, expedites the wear of the seal 370, etc.), and the valve component 51, 52 must be replaced. This results in added maintenance costs and reduces the utilization of the pump 100 because the pump 100 must be shut down in order to install new valve components 51, 52.

Figure 7:
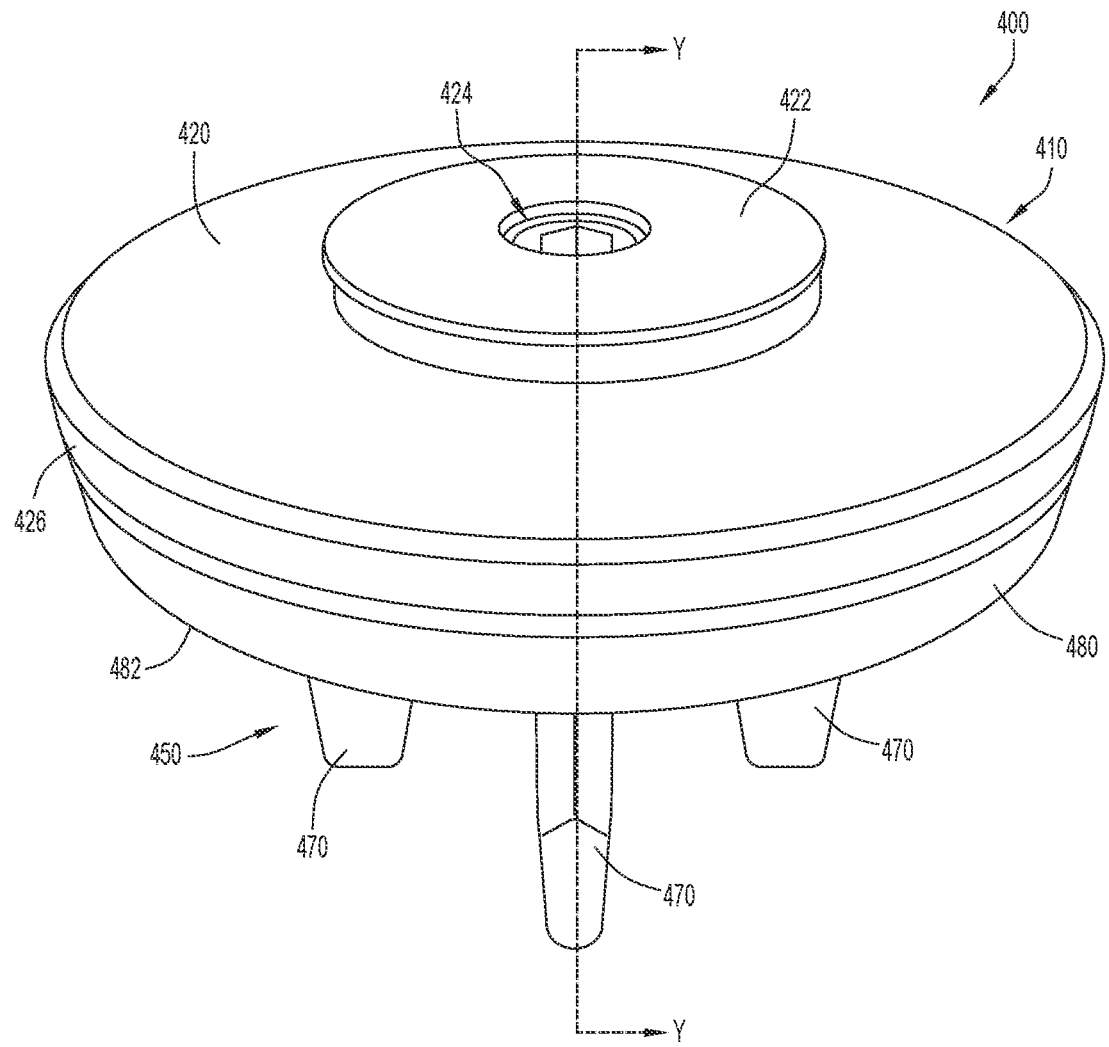
FIG. 7 illustrates a bottom perspective view of a valve component in accordance with a first embodiment of the present invention, the valve component including an insert that serves as the strike surface of the valve component.
Figure 8:
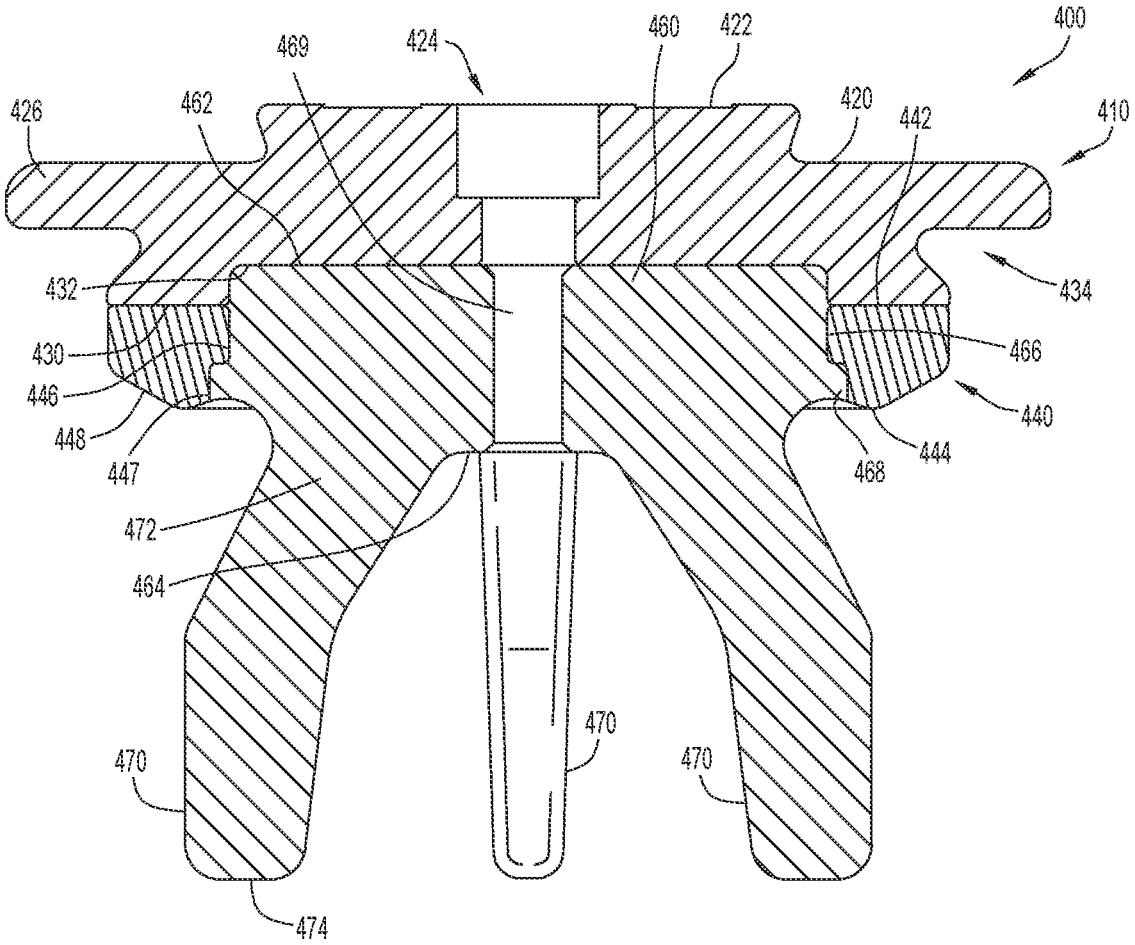
FIG. 8 illustrates a cross-sectional view of the valve component illustrated in FIG. 7 that is taken along line Y-Y in FIG. 7.
Figure 9:
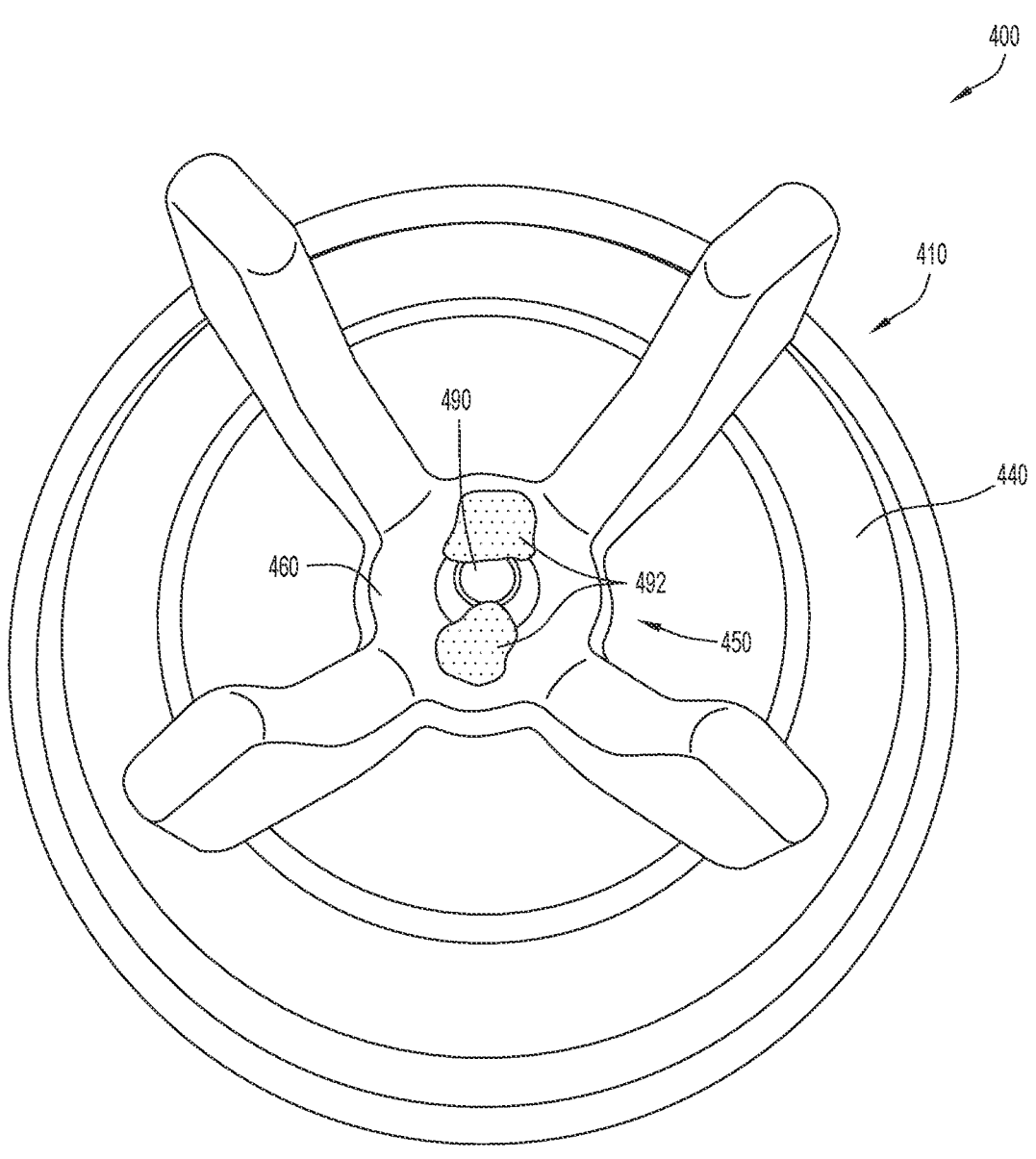
FIG. 9 illustrates a bottom view of the valve component illustrated in FIG. 7.

Turning to FIGS. 7, 8, and 9, illustrated is a valve component 400 that is capable of operation with the valve seat 380 like that of the valve component 51, 52 illustrated in FIGS. 2-6. However, notably, the valve component 400 contains a multi-piece construction. As best illustrated in FIGS. 7 and 8, the valve component 400 may include a valve body portion 410, an insert 440, a leg assembly portion 450, a seal 480, and a bolt or fastener 490 that is configured to secure the various components together.

The valve body portion 410 may include a first side 420 and an opposite second side 430 and may have a generally circular cross-sectional shape. The valve body portion 410 may be constructed from a metal, a metal alloy, or other similar material. As best illustrated in FIGS. 7 and 8, the first side 420 of the valve body portion 410 may have a central cylindrical protrusion 422 that extends from the surface of the first side 420 of the valve body portion 410. As best illustrated in FIG. 8, which is the cross-sectional view of the valve component 400, the second side 430 of the valve body portion 410 may include a central cavity 432. In some embodiments, this central cavity 432 may be circular. However, in other embodiments, this central cavity 432 may be of any other shape. As further illustrated in FIG. 8, a central conduit 424 may be disposed in the valve body portion 410 such that the central conduit 424 extends through the central cylindrical protrusion 422 and into the central cavity 432. FIGS. 7, 8, and 9 further illustrate that the valve body portion 410 includes an outer flange 426 extending radially from the first side 420 of the valve body portion 410. The space/area disposed between the outer flange 426 and the second side 430 of valve body portion 410 may serve as a sealing seat 434. The seal 480 may be coupled to the valve body portion 410 at the sealing seat 434. The valve body portion 410 may be constructed from a metal, a metal alloy, or other similar material.

Continuing with FIGS. 8 and 9, the insert 440 may include a first side 442 and an opposite second side 444. As best illustrated in FIG. 8, the insert 440 further includes a central opening 446 that spans from the first side 442 to the second side 444, and that gives the insert 440 an annular shape. An annular channel 447 is disposed about the central opening 446 proximate to the second side 444. In the illustrated embodiment, the diameter/width of the central opening 446 may be approximately equal to the diameter/width of the cavity 432 of the valve body portion 410. Moreover, the outer diameter of the insert 440 may be approximately equal to the outer diameter of the second side 430 of the valve body portion 410 (and, thus, smaller than the outer diameter of the first side 420 of the valve body portion 410). The second side 444 of the insert 440 may, at least partially, form a strike surface 448 that is angled with respect to the first side 442 of the insert 440. That is, the second side 444 may at least partially define a surface that abuts a valve seat with which the valve component 400 operates.

The insert 440 may be formulated or constructed from a carbide material (e.g., silicon carbide (SiC), tungsten carbide (WC), cementite ($Fe_3C$), etc.) or any ceramic material that is sufficiently hard, such as ceramic materials with a hardness equal to or greater than approximately 64 on the Rockwell scale (HRC). While the structure of these materials may be weak in tension, they may have a relatively high strength under compression, which is important for the construction presented in the present application. For example, the compressive strength of these materials may be higher than virtually all melted and cast or forged metals and alloys. In addition, these materials may be two to three times more rigid than steel and four to six times more rigid than cast iron and brass.

With continued reference to FIGS. 7-9, the leg assembly portion 450 may include a base portion or main body 460 and a set of legs 470. As best illustrated in FIG. 8, the main body 460 includes a first side 462, an opposite second side 464, and a sidewall 466 that spans between the first and second sides 462, 464. The main body 460 further includes a flange 468 that extends radially outward from the sidewall 466 proximate to the second side 464. A central conduit 469 may extend centrally through the main body 460 from the first side 462 to the second side 464. When the valve component 400 is fully assembled, the central conduit 469 may be aligned with the central conduit 424 of the valve body portion 410. As further illustrated, each leg 470 includes a first end 472 and an opposite second end 474. The first end 472 of each leg 470 may be coupled to the second side 464 of the main body 460 of the leg assembly portion 450 such that each leg 470 extends from the second side 464 of the main body 460 of the leg assembly portion 450. The leg assembly portion 450 may be constructed from a metal, a metal alloy, or other similar material.

Similar to the seal 370 of the prior art valve components 51, 52, the seal 480 may be coupled to the valve body portion 410 at the sealing seat 434 and may be any desired sealing element, such as a homogeneous elastomeric sealing element. In other words, the seal 370 may be constructed from a material suitable for forming a seal, such as, but not limited to rubbers, thermoplastic materials (e.g., thermoplastic polyurethane (TPU), etc.), etc. The seal 480 may include a sealing surface 482 and an opposite attachment surface 484 (not shown). The attachment surface 484 may be coupled to the sealing seat 434 of the valve body portion 410 in a manner where the seal 480 may be molded onto, adhered to, or bonded to the sealing seat 434 of the valve body portion 410. When coupled to the valve body portion 410, the sealing surface 482 may serve as an extension of the strike surface 448 of the insert 440. In other words, the seal 480 may form, in conjunction with the strike surface 448 of the insert 440, a sealing surface of the valve component 400.

Continuing with FIGS. 7-9, when the valve component 400 is fully assembled, the insert 440 is at least partially compressed or captured between the valve body portion 410 and the leg assembly portion 450. More specifically, the first side 442 of the insert 440 is placed in abutment with the second side 430 of the valve body portion 410. In addition, the central opening 446 of the insert 440 may be aligned with the cavity 432 in the second side 430 of the valve body portion 410. The first side 462 of the main body 460 of the leg assembly portion 450 may be inserted through the central opening 446 of the insert 440 until the first side 462 of the main body 460 of the leg assembly portion 450 is disposed adjacent to or in abutment with the interior of the cavity 432 of the second side 430 of the valve body portion 410. Moreover, in this assembled position, the flange 468 of the main body 460 of the leg assembly portion 450 may be disposed within the annular channel 447 of the central opening 446 of the insert 440. In this position, the second side of the main body 460 may be aligned with, or flush with, a portion of the second side 444 of the insert 440. More specifically, the insert 440 is compressed between, captured between, and/or sandwiched by the flange 468 of the main body 460 of the leg assembly portion 450 and the second side 430 of the valve body portion 410.

As mentioned, when in the assembled position the central conduit 424 of the valve body portion 410 is aligned with the central conduit 469 of the leg assembly portion 450. Then, a bolt 490 may be inserted into and at least partially through both the central conduit 424 of the valve body portion 410 and the central conduit 469 of the leg assembly portion 450 to secure the valve body portion 410, the insert 440, and the leg assembly portion 450 together. As best illustrated in FIG. 9, the bolt 490 may at least partially extend through the central conduits 424, 469 such that a portion of the bolt 490 extends beyond the second side 464 of the main body 460 of the leg assembly portion 450. The portion of the bolt 490 extending beyond the second side 464 of the main body 460 may be tack welded or spot welded 492 to secure the bolt 490 in place. In the assembled position, the carbide/ceramic insert 440 may be compressed. As previously explained, the carbide/ceramic materials, when compressed, exhibit relatively higher strength, and are more rigid than virtually all melted and cast or forged metals and alloys.

Turning to FIGS. 10-15, illustrated is another embodiment of a valve component 500 that contains a multi-piece construction similar to that of the embodiment of the valve component 400 illustrated in FIGS. 7-9. Like the valve component 400 and the prior art valve components 51, 52, the valve component 500 may also be utilized with the prior art valve seat 380. The valve component 500 may include, as illustrated, a valve body portion 510, an insert 540, a leg assembly portion 550, and a seal (not shown). As explained in further detail below, and unlike the valve component 400, the valve component 500 does not utilize a separate and stand-alone bolt or fastener to secure the various components of the valve component 500 together.

The valve body portion 510 of the valve component 500 may include a first side 520 and an opposite second side 530 and may have a generally circular cross-sectional shape. The valve body portion 510 may be constructed from a metal, a metal alloy, or other similar material. As best illustrated in FIGS. 12 and 13, the first side 520 of the valve body portion 510 may have a central cylindrical protrusion 522 that extends from the surface of the first side 520 of the valve body portion 510. FIGS. 11, 12, and 13 further illustrate that the second side 530 of the valve body portion 410 may include a central aperture 534, which may further include a set of threads 536 disposed on the inner surface of the central aperture 534. In the illustrated embodiment, the central aperture 534 may not extend through the entire thickness of the valve body portion 510, and, instead, may terminate prior to the first side 520 of the valve body portion 510. FIGS. 10-13 further illustrate that the valve body portion 510 also includes an outer flange 524 extending radially from the first side 520 of the valve body portion 510. Because of the outer flange 524, the first side 520 of the valve body portion 510 may have a larger diameter than the second side 530 of the valve body portion 510. The space/ area disposed between the outer flange 524 and the second side 530 of valve body portion 510 may serve as a sealing seat 532. The seal 580 (not shown) may be coupled to the valve body portion 510 at the sealing seat 532.

Figure 14:
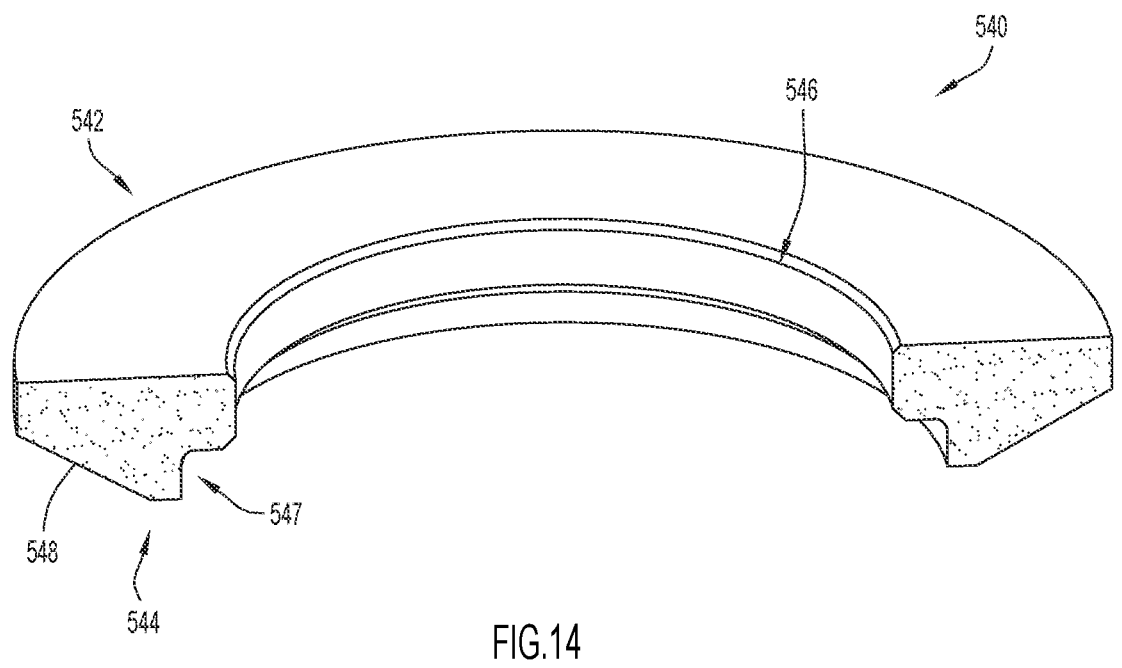
FIG. 14 illustrates an isolated cross-sectional view of the insert of the valve component illustrated in FIG. 10.

As illustrated in FIGS. 10, 11, 12, and 14, the insert 540 of the valve component 500 may be similar to the insert 440 of the valve component 400. The insert 540 of the valve component 500 may include a first side 542 and an opposite second side 544. As best illustrated in FIGS. 11, 12, and 14, the insert 540 further includes a central opening 546 that spans from the first side 542 to the second side 544, and that gives the insert 540 an annular shape. An annular channel 547 is disposed about the inner surface of the central opening 546 proximate to the second side 544. In the illustrated embodiment, the overall diameter of the insert 540 may be approximately equal to the diameter of the second side 530 of the valve body portion 510. As further illustrated, the second side 544 of the insert 540 may, at least partially, form/define a strike surface 548 that is angled with respect to the first side 542 of the insert. Like the insert 440 of the valve component 400, the insert 540 of the valve component 500 may be formulated or constructed from a carbide material (e.g., silicon carbide (SiC), tungsten carbide (WC), cementite ($Fe_3C$), etc.) or a ceramic material that is sufficiently hard, such as ceramic materials with a hardness equal to or greater than approximately 64 on the Rockwell scale (HRC).

Figure 15:
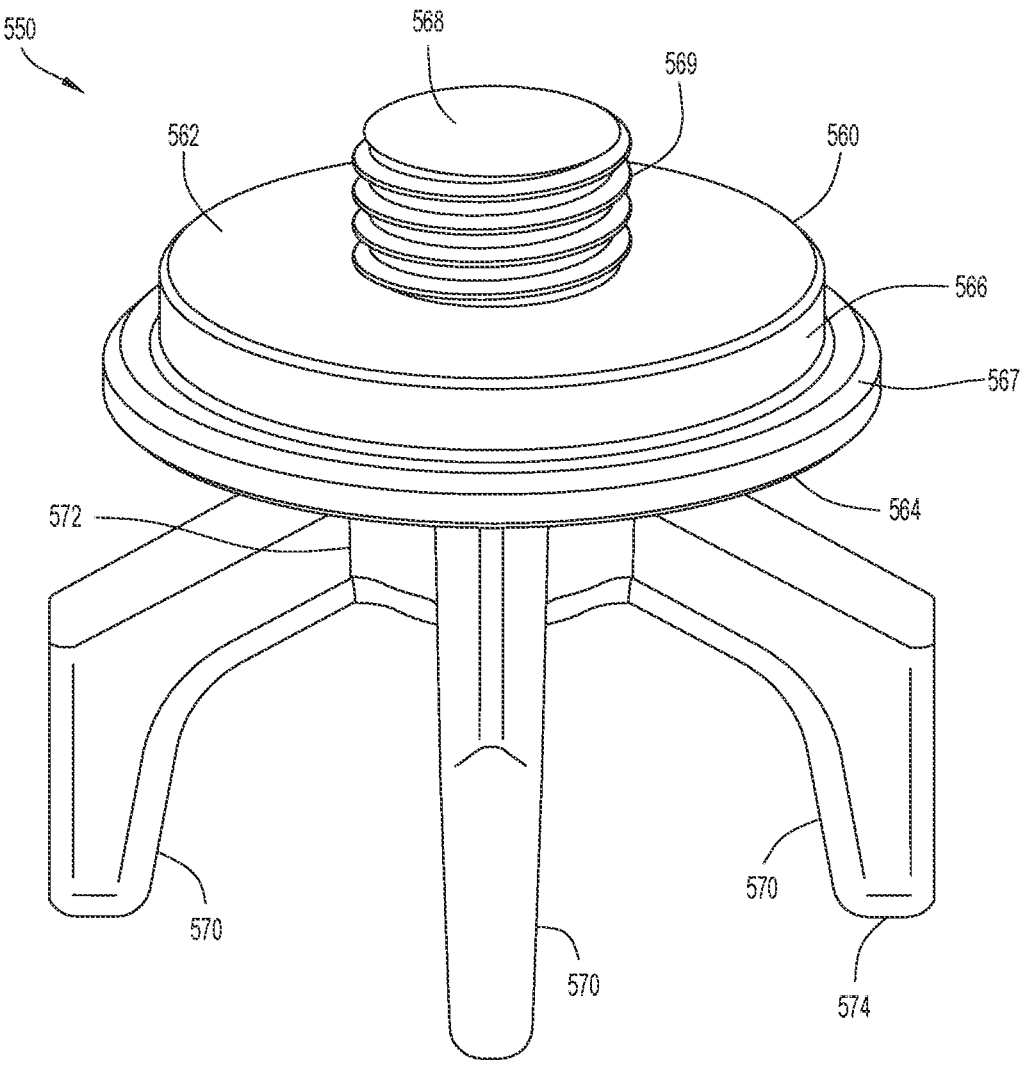
FIG. 15 illustrates an isolated perspective view of the leg assembly portion of the valve component illustrated in FIG. 10.

Continuing with FIGS. 10, 11, 12, and 15, the leg assembly portion 550 may include a main body or base portion 560 and a set of legs 570. As best illustrated in FIGS. 11, 12, and 15, the main body 560 includes a first side 562, an opposite second side 564, and a sidewall 566 that spans between the first and second sides 562, 564. The main body 560 may have a generally cylindrical shape. The main body 560 also includes a flange 567 that extends radially outward from the sidewall 566 proximate to the second side 564. As best illustrated in FIG. 15, an extension member 568 have a generally cylindrical shape is centrally disposed on, and extends from, the first side 562 of the main body 560. The extension member 568 includes a set of threads 569 disposed about the outer surface of the extension member 568. When the valve component 500 is fully assembled, the extension member 568 (and by association, the leg assembly portion 550) may be aligned with and screwed into the central aperture 534 of the valve body portion 410. Thus, the threads 569 of the extension member 568 may be configured to intermesh with the threads 536 of the central aperture 534.

Still referring to FIGS. 10, 11, 12, and 15, each leg 570 of the leg assembly portion 550 includes a first end 572 and an opposite second end 574. The first end 572 of each leg 570 may be coupled to the second side 564 of the main body 560 of the leg assembly portion 550. Thus, each leg 570 extends from the second side 564 of the main body 560 of the leg assembly portion 550.

Figure 10:
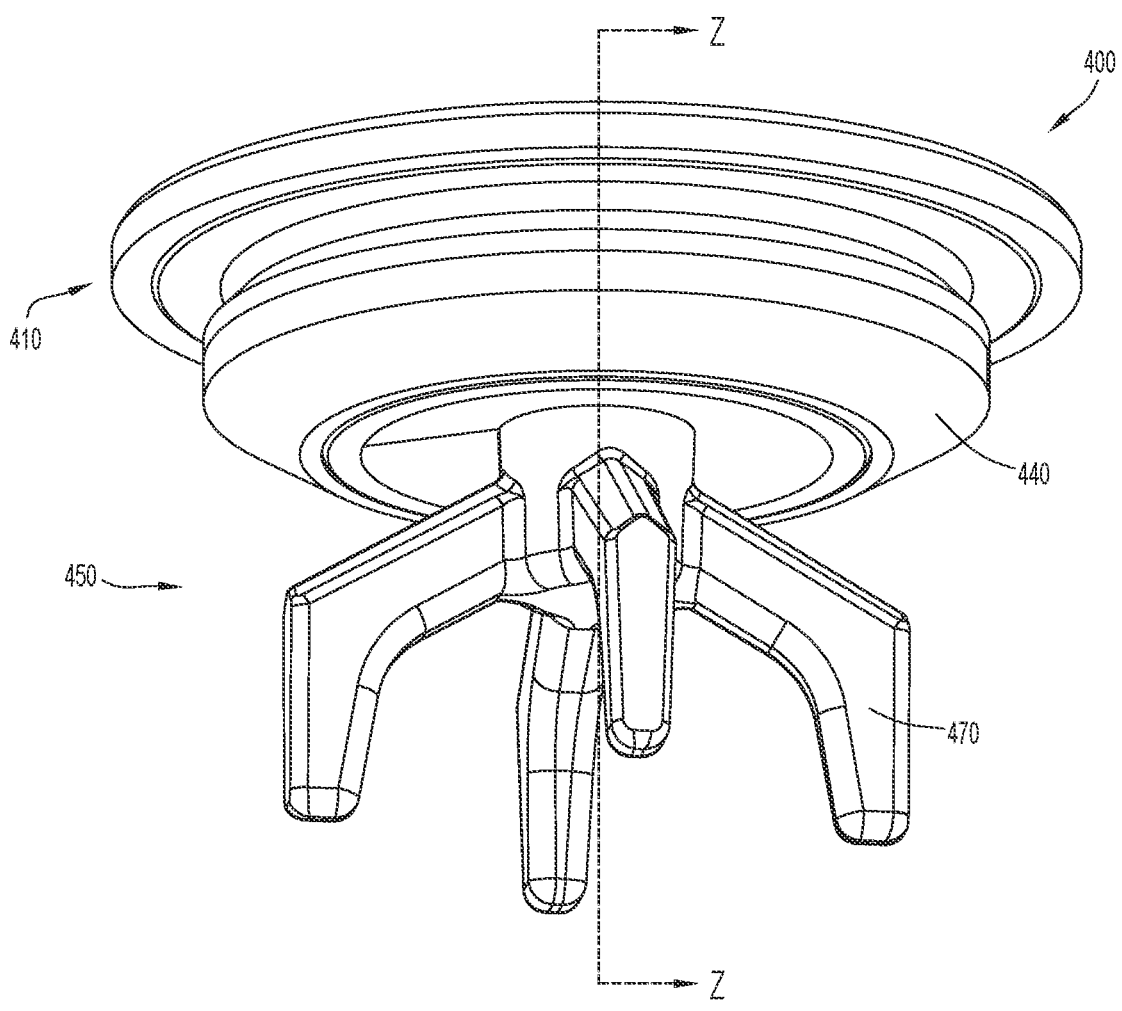
FIG. 10 illustrates a perspective view of a valve component in accordance with a second embodiment of the present invention, the valve component including an insert that serves as a strike surface of the valve component.
Figure 11:
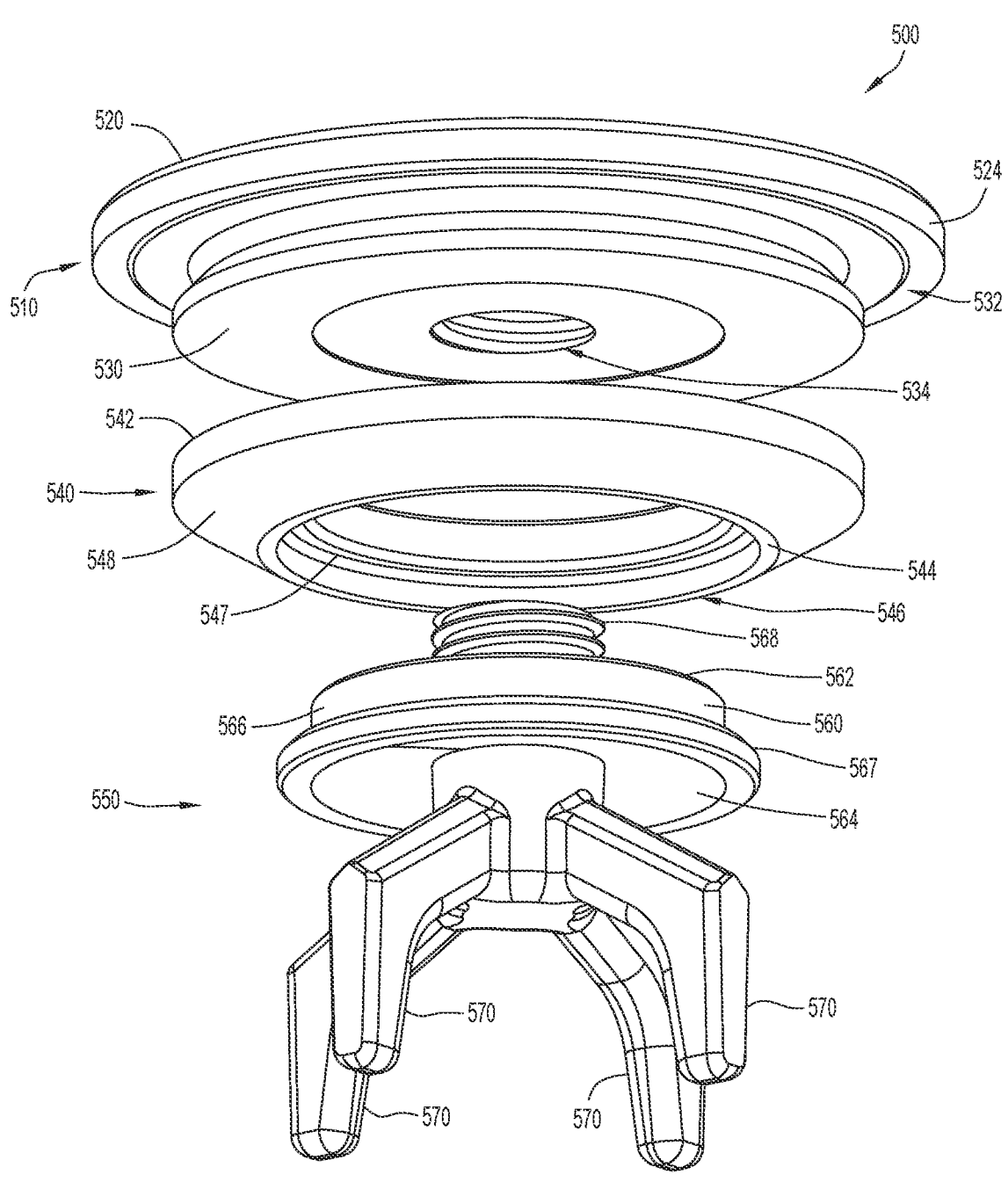
FIG. 11 illustrates an exploded view of the valve component illustrated in FIG. 10.
Figure 12:
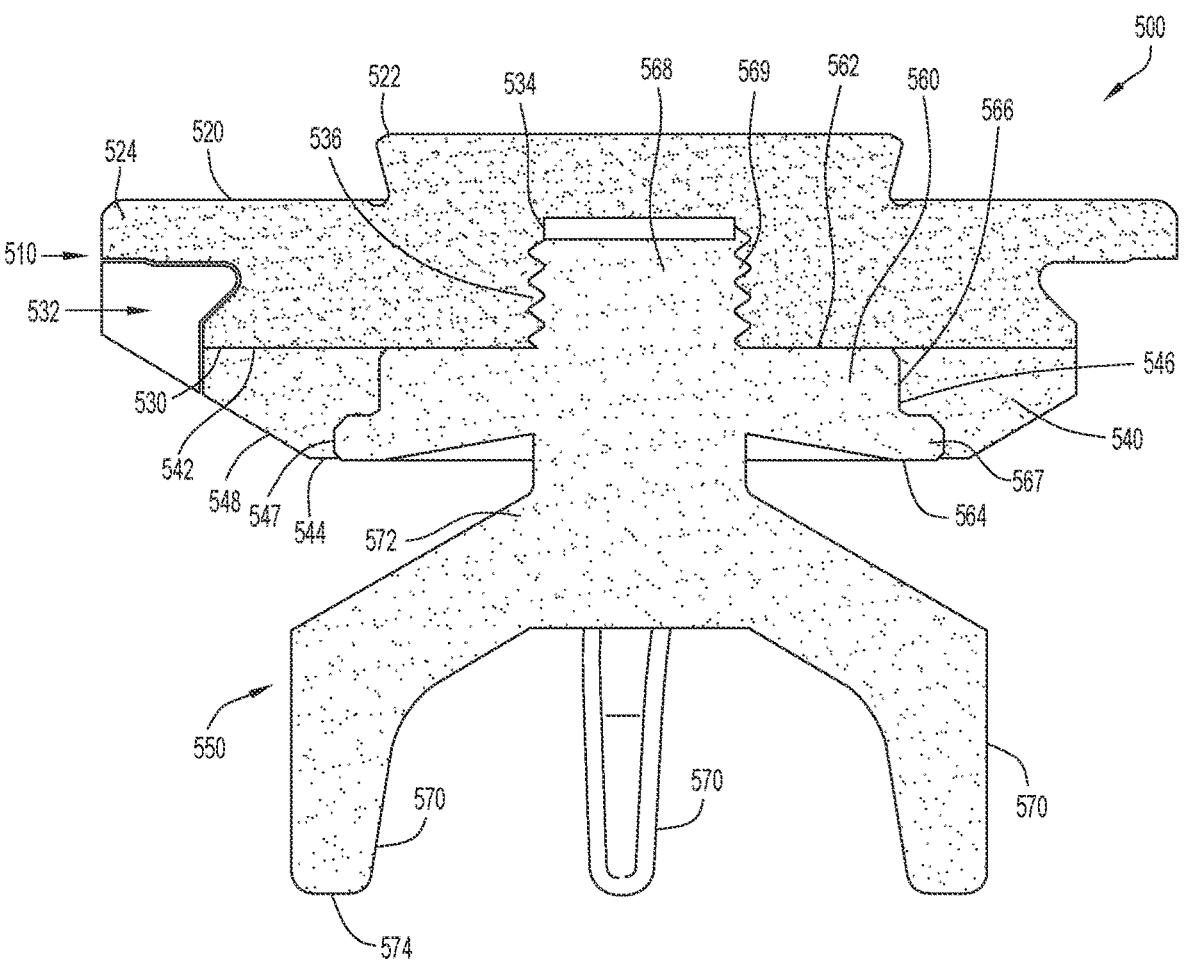
FIG. 12 illustrates a cross-sectional view of the valve component illustrated in FIG. 10 that is taken along line Z-Z in FIG. 10.
Figure 13:
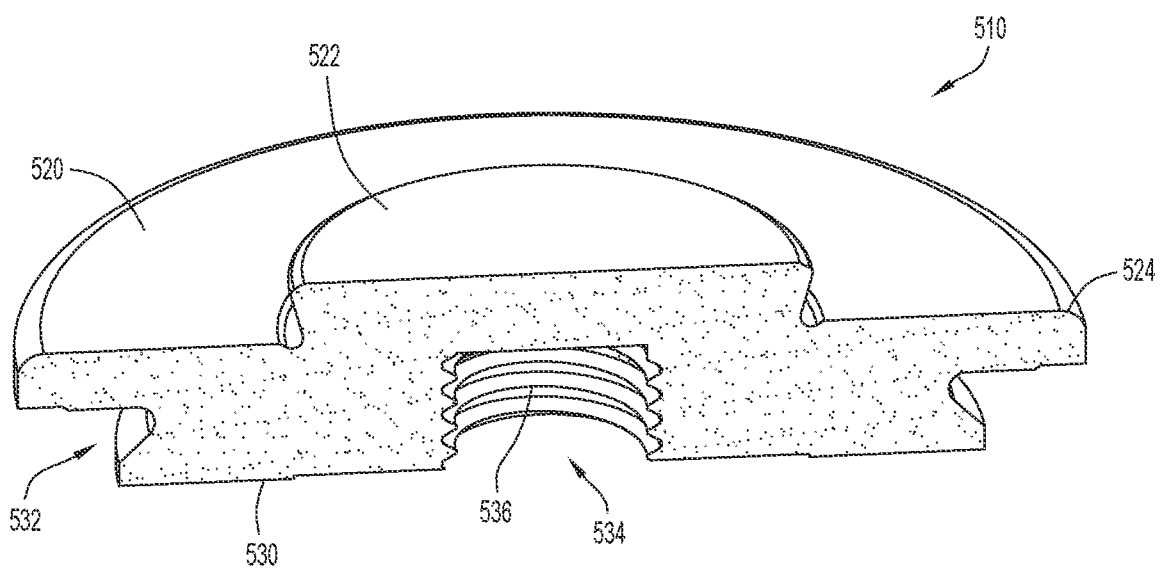
FIG. 13 illustrates an isolated cross-sectional view of the valve body portion of the valve component illustrated in FIG. 10.

With continued reference to FIGS. 10-12, when the valve component 500 is fully assembled, the insert 540 is at least partially compressed between the valve body portion 510 and the leg assembly portion 550. More specifically, the first side 542 of the insert 540 is placed in abutment with the second side 530 of the valve body portion 510 such that the outer perimeter of the insert 540 is aligned with the outer perimeter of the second side 530 of the valve body portion 510, and such that the central aperture 534 of the valve body portion 510 is aligned with the central opening 546 of the insert 540. The first side 562 of the main body 560 of the leg assembly portion 550 may be inserted through the central opening 546 of the insert 540 until the extension member 568 of the main body 560 is at least initially inserted into the central aperture 534 of the second side 530 of the valve body portion 510.

Once the extension member 568 is aligned and partially inserted into the central aperture 534 of the valve body portion 510, the leg assembly portion 550 may be rotated in a first direction so that the threads 569 of the extension member 568 engage/intermesh with the threads 536 of the central aperture 534. Continued rotation of the leg assembly portion 550 in the first direction may translate the first side 562 of the main body 560 of the leg assembly portion 550 toward the second side 530 of the valve body portion 510 until the first side 562 of the main body 560 of the leg assembly portion 550 is adjacent to, or in abutment with, the second side 530 of the valve body portion 510. Moreover, in this assembled position, the flange 567 of the main body 560 of the leg assembly portion 550 may be disposed within the annular channel 547 of the central opening 546 of the insert 540. Like with the insert 440 of the valve component 400, the insert 540 of the valve component 500 is specifically compressed between, captured between, and/or sandwiched by, the flange 567 of the main body 560 of the leg assembly portion 550 and the second side 530 of the valve body portion 510. As mentioned, the carbide/ceramic materials, when compressed, exhibit relatively higher strength, and are more rigid than virtually all melted and cast or forged metals and alloys.

At least because the multi-piece constructed valve components 400, 500 depicted herein include a strike surface 448, 548 defined by an insert of specifically selected materials, the valve components 400, 500 depicted herein provide a strike surface 448, 548 that is less susceptible to abrasive wear and erosion than prior art valve components (e.g., valve components having strike surfaces constructed from metals and metal alloys). Thus, the multi-piece construction of the valve components 400, 500 results in a longer lasting valve component, reducing the costs of use and maintenance of the pumps 100 while increasing the utilization of the pump through the reduction in pump downtime for maintenance. In addition, once the strike surface 448, 548 of the valve components 400, 500 do become worn and eroded, the inserts 440, 540 may be replaced without having to exchange the entire valve component. This further reduces material costs and material waste as the other portions of the valve components 400, 500 may still be capable of functioning with the installation of a new insert 440, 540.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the valve components, valve body portions, inserts, leg assemblies, and sealing elements described herein may be modified to be of any shape and of any material.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the fluid pump described herein, the fluid end assembly described herein, the valve components, valve body portions, inserts, leg assembly portions, and sealing element described herein, or portions thereof, may be fabricated from any suitable material or combination of materials, such as, but not limited to, plastics, metals (e.g., nickel, copper, bronze, aluminum, steel, etc.), metal alloys, carbides, ceramics, elastomeric materials, etc., as well as derivatives thereof, and combinations thereof, unless otherwise specified. In addition, it is further to be understood that the steps of the assembly of the valve components described herein may be performed in any order or in any suitable manner.

Finally, when used herein, the term "comprises" and its derivations (such as "comprising," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about," "around," "generally," and "substantially."

What is claimed is:

1. A valve for a reciprocating pump, the valve comprising:
a valve body having a first side that delimits a top of the valve body and an opposite second side that delimits a bottom of the valve body, the valve body defining a sealing seat around an exterior of the valve body;
a seal that is removably installed in the sealing seat;
a leg assembly removably coupled to the valve body, the leg assembly having a first side and an opposite second side, wherein the first side of the leg assembly abuts and engages the second side of the valve body when the leg assembly is coupled to the valve body; and
an insert constructed from a ceramic material or a carbide material, the insert being at least partially captured between the second side of the valve body and the leg assembly in a position where the insert and the seal form a strike surface of the valve that contacts a valve seat of the reciprocating pump.

2. The valve according to claim 1, wherein the insert is annular with a central opening.

3. The valve according to claim 2, wherein the insert further comprises:

a first side; and a second side opposite the first side, the second side being angled with respect to the first side and forming at least a portion of the strike surface of the valve.

4. The valve according to claim 2, wherein the insert further includes an annular channel disposed around an interior surface of the central opening.

5. The valve according to claim 4, wherein the leg assembly further includes:

a sidewall extending between the first side of the leg assembly and the second side of the leg assembly; and a flange extending radially from the sidewall, wherein, when the leg assembly is coupled to the valve body, the flange is disposed in the annular channel of the insert.

6. The valve according to claim 1, wherein the second side of the valve body includes a central aperture with a first set of threads.

7. The valve according to claim 6, wherein the leg assembly further includes:

an extension member extending from the first side of the leg assembly, the extension member having a second set of threads that are configured to engage with the first set of threads, wherein the extension member is configured to be screwed into the central aperture of the valve body to removably couple the leg assembly to the valve body.

8. A valve for a reciprocating pump, the valve comprising:

a valve body defining a sealing seat around an exterior of the valve body;

a seal that is removably installed in the sealing seat;

a leg assembly removably coupled to the valve body, the leg assembly having a base portion and a set of legs extending from the base portion, wherein the base portion of the leg assembly abuts and engages a bottom of the valve body; and an insert constructed from a ceramic material or a carbide material, the insert being at least partially disposed between and in abutment with the valve body and the base portion of the leg assembly so that the insert and the seal form a strike surface of the valve that contacts a valve seat of the reciprocating pump.

9. The valve according to claim 8, wherein the insert is annular with a central opening and an annular channel disposed around an interior surface of the central opening.

10. The valve according to claim 9, wherein the base portion of the leg assembly is cylindrical and comprises:

a first side;

a second side opposite the first side;

a sidewall spanning between the first side and the second side; and a flange extending radially from the sidewall proximate to the second side, wherein, when the leg assembly is coupled to the valve body, positioning the flange in the annular channel of the insert retains the insert in abutment with the valve body and the base portion of the leg assembly.

11. The valve according to claim 8, wherein the insert comprises:

a first side; and a second side opposite the first side, the second side being angled with respect to the first side and forming at least a portion of the strike surface of the valve.

12. The valve according to claim 8, wherein the bottom of the valve body includes a central aperture with a first set of threads.

13. The valve according to claim 12, wherein the leg assembly further includes:

an extension member extending from a first side of the base portion, the extension member having a second set of threads that are configured to engage with the first set of threads, wherein the extension member is configured to be screwed into the central aperture of the valve body to removably couple the leg assembly to the valve body.

14. A valve for a reciprocating pump, the valve comprising:

a valve body defining a sealing seat around an exterior of the valve body;

a seal that is removably installed in the sealing seat;

an insert constructed from a ceramic material or a carbide material, the insert being disposed against the valve body so that the insert and the seal form a strike surface of the valve that contacts a valve seat of the reciprocating pump; and a leg assembly removably coupled to the valve body, the leg assembly including a base portion and a set of legs extending from the base portion, wherein, when the leg assembly is removably coupled to the valve body, the base portion of the leg assembly abuts and engages a bottom of the valve body and the base portion compresses at least a portion of the insert against the valve body.

15. The valve according to claim 14, wherein the insert is annular with a central opening and an annular channel disposed around an interior surface of the central opening.

16. The valve according to claim 15, wherein the base portion of the leg assembly is cylindrical and comprises:

a first side;

a second side opposite the first side;

a sidewall spanning between the first side and the second side; and a flange extending radially from the sidewall proximate to the second side, wherein, when the leg assembly is coupled to the valve body, the flange is disposed in the annular channel of the insert.

17. The valve according to claim 14, wherein the insert comprises:

a first side; and a second side opposite the first side, the second side being angled with respect to the first side and forming at least a portion of the strike surface of the valve.

\* \* \* \* \*